(12) United States Patent
Hamende et al.

(10) Patent No.: US 6,863,824 B2
(45) Date of Patent: Mar. 8, 2005

(54) CHROMATOGRAPHY METHOD AND DEVICE WITH RECOVERY OF SOLVENT

(75) Inventors: Michel Hamende, Brussels (BE); Marc Chatel, Brussels (BE); Laurent Rebier, Nancy (FR); Roger-Marc Nicoud, Lay Saint Christophe (FR)

(73) Assignee: Novasep, Pompey (FR)

( * ) Notice: Subject to any disclaimer, the term of this patent is extended or adjusted under 35 U.S.C. 154(b) by 1 day.

(21) Appl. No.: 10/369,514

(22) Filed: Feb. 21, 2003

(65) Prior Publication Data

US 2003/0222024 A1 Dec. 4, 2003

(30) Foreign Application Priority Data

Feb. 22, 2002 (FR) .............................................. 02 02280

(51) Int. Cl.[7] .............................................. B01D 15/08
(52) U.S. Cl. ..................... 210/659; 210/656; 210/198.2
(58) Field of Search ................ 210/635, 656, 210/659, 198.2; 203/1, 2, 3

(56) References Cited

U.S. PATENT DOCUMENTS

| | | | | |
|---|---|---|---|---|
| 4,293,346 A | * | 10/1981 | Landis et al. .............. | 127/46.2 |
| 4,434,027 A | | 2/1984 | Eversdijk | |
| 4,498,991 A | * | 2/1985 | Oroskar ...................... | 210/659 |
| 5,434,299 A | * | 7/1995 | Negawa et al. ............. | 560/248 |
| 5,498,752 A | * | 3/1996 | Negawa et al. ............. | 560/249 |
| 5,705,061 A | * | 1/1998 | Moran ..................... | 210/198.2 |
| 5,763,645 A | * | 6/1998 | Negawa et al. ............. | 560/248 |
| 6,004,518 A | * | 12/1999 | Green ........................ | 422/190 |
| 6,325,898 B1 | | 12/2001 | Blehaut et al. | |
| 6,379,554 B1 | * | 4/2002 | Kearney et al. ............ | 210/659 |
| 6,602,420 B2 | * | 8/2003 | Kearney et al. ............ | 210/659 |

FOREIGN PATENT DOCUMENTS

| | | |
|---|---|---|
| DE | 1091985 | 11/1960 |
| NL | 83916 | 1/1957 |

OTHER PUBLICATIONS

International Search Report for FR 0202280 dated Nov. 8, 2002.

* cited by examiner

*Primary Examiner*—Ernest G. Therkorn
(74) *Attorney, Agent, or Firm*—Millen White Zelano & Branigan P.C.

(57) ABSTRACT

A method and device for chromatographic separation producing at least two fractions are provided, in which: (i) the solvent is at least partially evaporated from the fractions produced; (ii) the solvent vapours thus produced are separated; stage (i) of the method being carried out, for at least one of the fractions, at least partially with the separated solvent vapours originating from one of the other evaporated fractions.

11 Claims, 4 Drawing Sheets

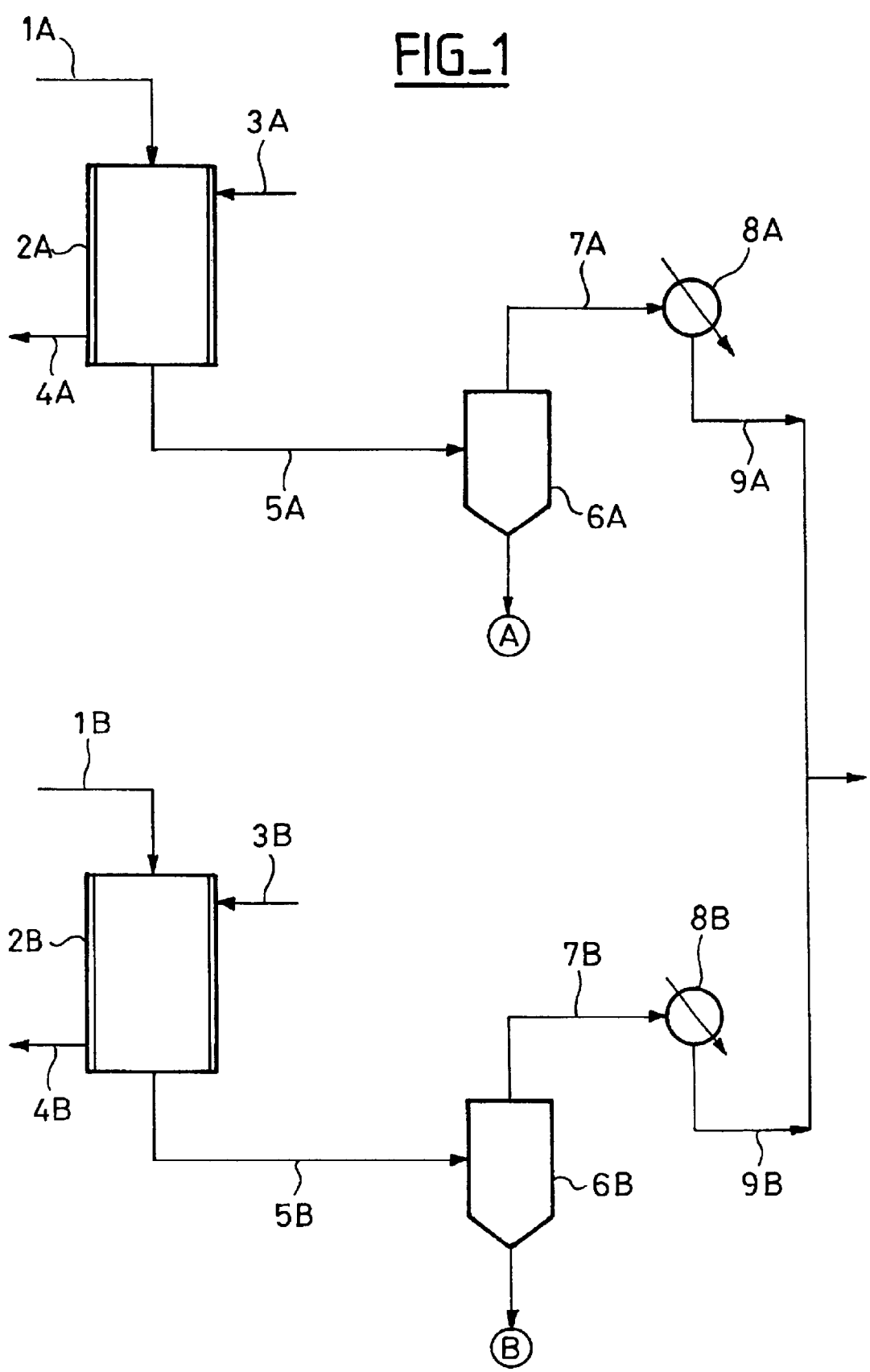
FIG_1

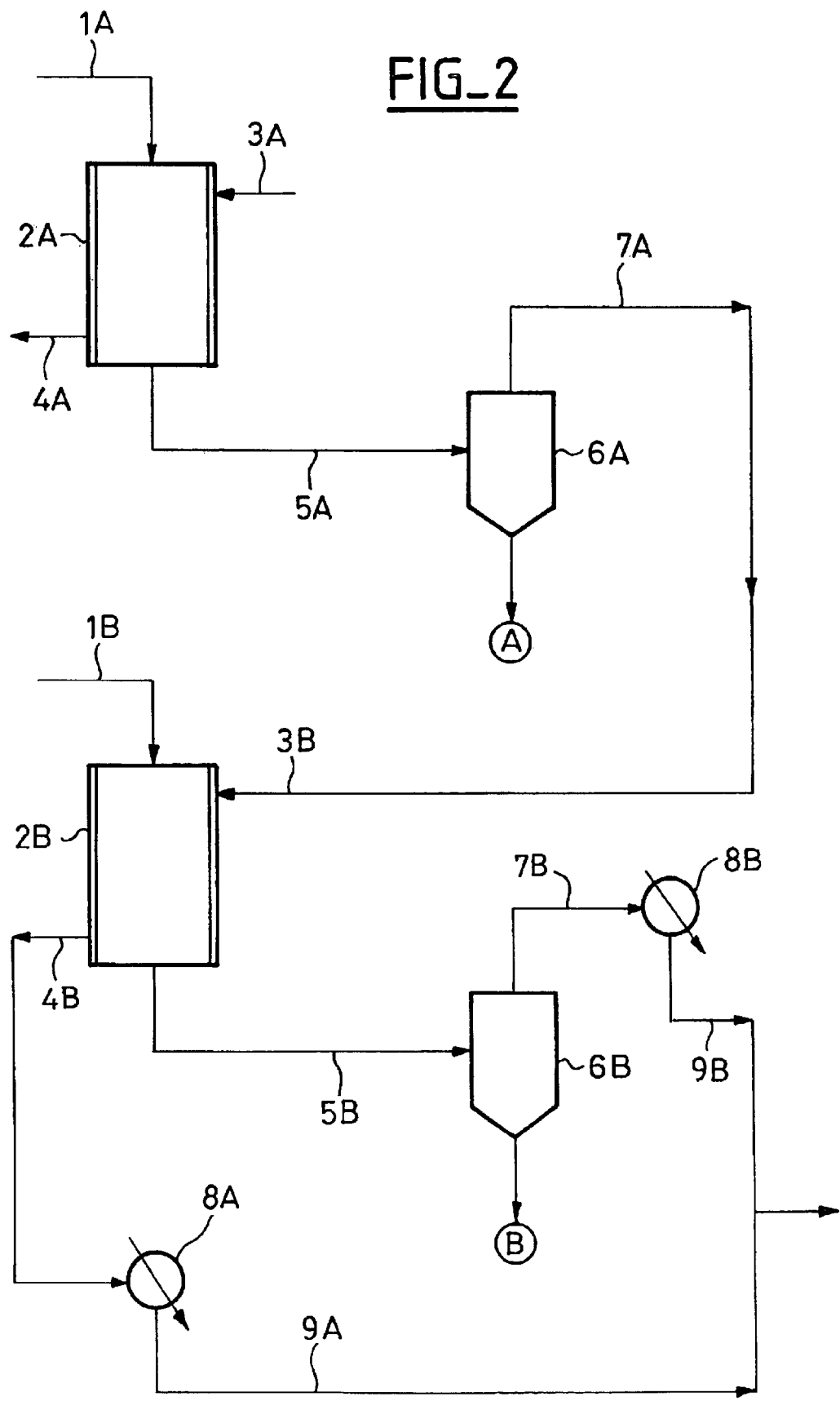
FIG_2

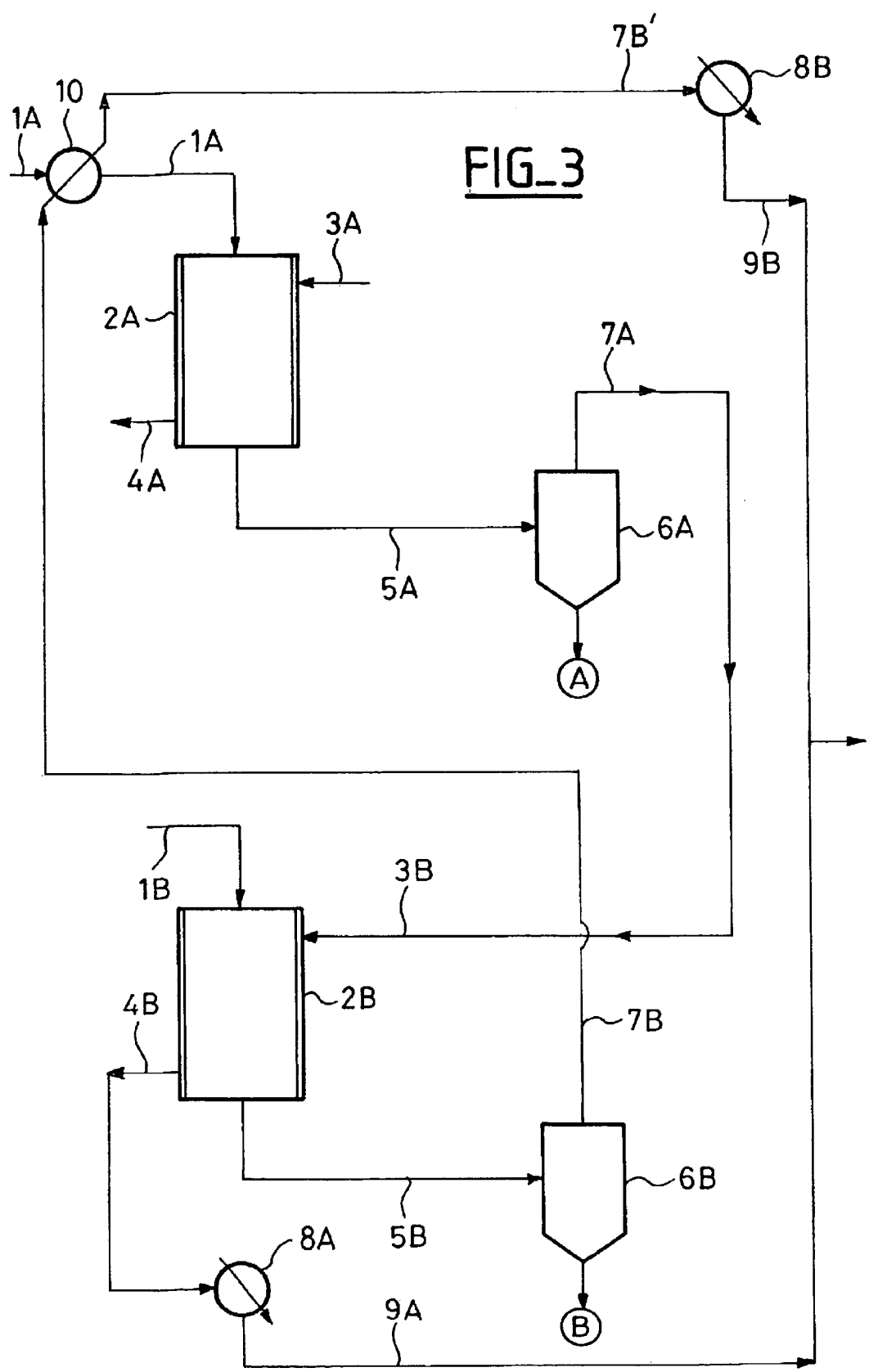
FIG_3

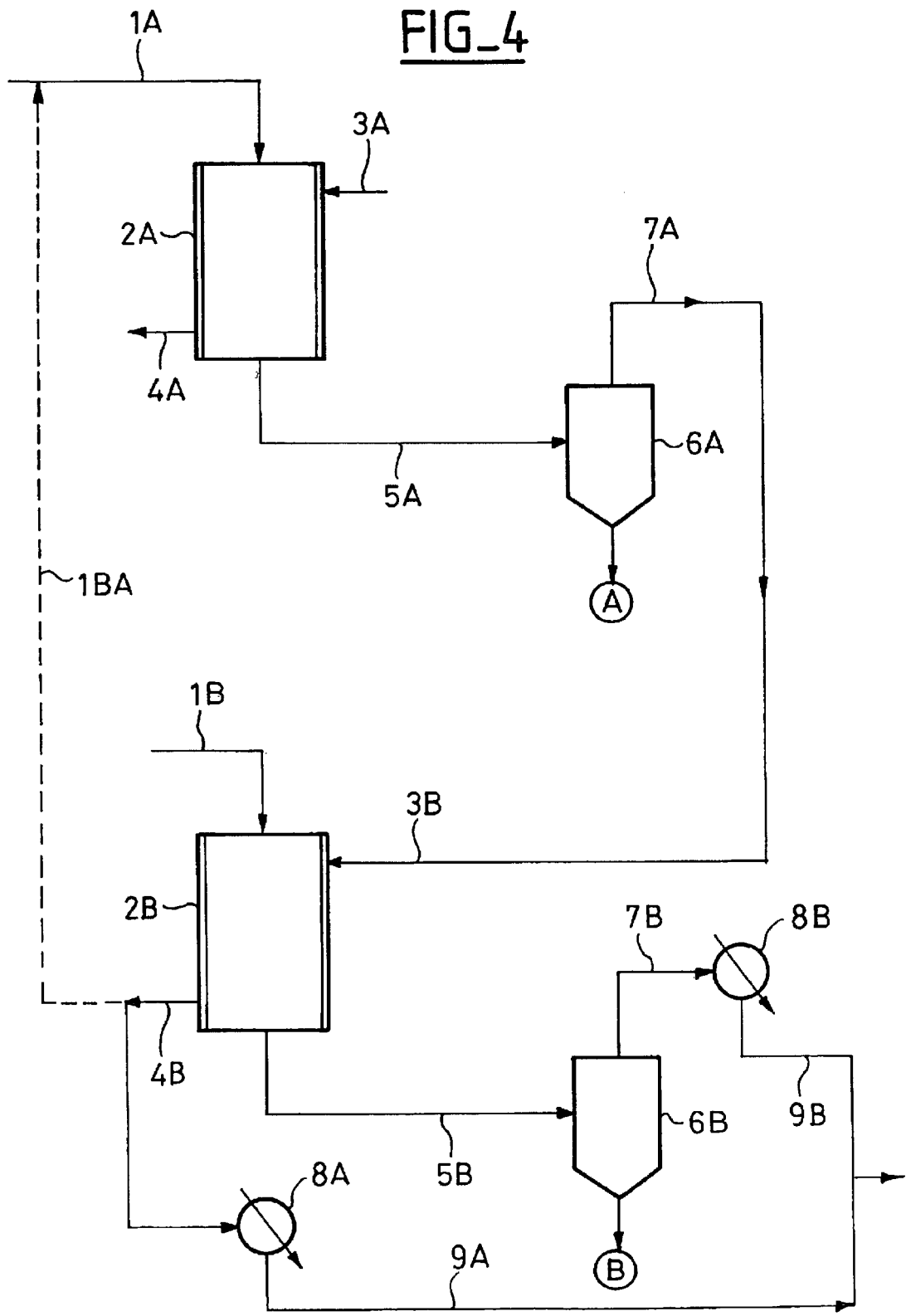
FIG_4

US 6,863,824 B2

CHROMATOGRAPHY METHOD AND DEVICE WITH RECOVERY OF SOLVENT

The present invention relates to a chromatography method process and device which makes possible efficient recovery of the solvent used.

Preparative chromatography is used as a method for purifying mixtures, in particular pharmaceutical mixtures. For example, current chromatography methods can be represented schematically as the separation of two "Components" of a charge or mixture to be purified, using a chromatographic bed and solvent, two fractions being produced, one with a first "component" and the other with a second "component". One of the two, and more rarely both, components is (are) desired.

Conventional "elution" (or batch) chromatography, even when it makes use of efficient column technology, consumes large amounts of solvents. This solvent consumption is a significant cost factor, the impact of which can be minimized by appropriate recycling generally carried out by evaporation [M. Perrut and J. C. Trap, Analysis, Vol. 15, No. 8, 1987].

Specific chromatographic uses which make possible continuous operations (in particular countercurrent-wise) have been provided in order to maximize productive output and/or to minimize solvent consumption [R. M. Nicoud and R. E. Majors, LC-GC Europe, December 2000, p. 887; O. Ludemann-Hombourger, R. M. Nicoud and M. Bailly, Separation Science and Technology, 35(12), pp. 1829–1862, 2000].

EP-A-563 388 discloses the combination of the "SMB" (Simulated Moving Bed) technique with a solvent recycling system.

The techniques described above make it possible to respond to outputs of low or moderate tonnages. When outputs reach high levels (tens of tonnes per year for the separation of enantiomers, for example), it turns out that the energy consumption necessary for the evaporation becomes a significant cost factor.

It is an object of the invention to minimize the costs associated with the recovery of the solvent and in particular the energy costs required for the separation from the various fractions resulting from chromatography.

A subject-matter of the invention is therefore a method which makes it possible to minimize the energy consumption necessary for the evaporation of the solvent from these fractions.

The invention thus provides a method for chromatographic separation producing at least two fractions, in which method:

(i) the solvent is at least partially evaporated from the said fractions produced;

(ii) the solvent vapours thus produced are separated;

characterized in that stage (i) of the method is carried out, for at least one of the said fractions, at least partially with the separated solvent vapours originating from one of the other evaporated fractions.

According to one embodiment, two extract and raffinate fractions are evaporated.

According to one embodiment, stage (i) is carried out, for a fraction under consideration, entirely with the separated solvent vapours originating from one of the other evaporated fractions.

According to one embodiment, a portion of the separated solvent vapours originating from the other evaporated fraction is partially recycled, after evaporation of the fraction under consideration, to the upstream side of stage (i) for evaporation of the said other fraction.

According to one embodiment, at least one of the fractions is preheated before evaporation with the separated solvent vapours originating from one of the other evaporated fractions.

According to one embodiment, the solvent is recycled.

Another subject-matter of the invention is a device for carrying out the method according to the invention.

A further subject-matter of the invention is therefore a chromatography device comprising:

(i) a central unit for separation on a chromatographic bed, (ii) at least two lines of fractions (1A, 1B) deriving therefrom, (iii) at least two evaporators (2A, 2B) connected to the said fraction lines, (iv) heat-exchange fluid lines (3A, 3B) being connected to at least two evaporators (2A, 2B) respectively, (v) withdrawal lines (5A, 5B) collecting, downstream of the said evaporators (2A, 2B), the at least partially evaporated fraction in the form of a liquid+vapour mixture, (vi) separators (6A, 6B) connected to the said withdrawal lines (5A, 5B) to collect the solvent in a line (7A, 7B), in which the line (7A) is connected to the line (3B) as heat-exchange fluid line.

According to one embodiment, the lines (1A) and (1B) correspond to extract and raffinate fractions, respectively.

According to one embodiment, the device additionally comprises a heat exchanger (10) positioned on the line (1A) and furthermore connected to the line (7B) as heat-exchange fluid.

According to one embodiment, the device additionally comprises a solvent and heat-exchange fluid line (4B) leaving the evaporator (2B) and a line (1BA) connecting the said line (4B) to the line (1A) feeding the evaporator (2A), for partial recycling.

According to one embodiment, the evaporators are single-effect evaporators.

According to one embodiment, the evaporators are multiple-effect evaporators.

According to one embodiment, the device additionally comprises a device for recycling the solvent.

According to one embodiment, the central unit for separation on a chromatographic bed is of the SMB type.

According to one embodiment, the central unit for separation on a chromatographic bed is of the Varicol type.

A further subject-matter of the invention is still a chromatography device comprising:

(i) a central unit for separation on a chromatographic bed, (ii) at least two lines of fractions (1A, 1B) deriving therefrom, the lines (1A) and (1B) corresponding to extract and raffinate fractions, respectively, (iii) at least two evaporators (2A, 2B) connected to the said fraction lines, (iv) heat-exchange fluid lines (3A, 3B) being connected to at least two evaporators (2A, 2B) respectively, (v) withdrawal lines (5A, 5B) collecting, downstream of the said evaporators (2A, 2B), the at least partially evaporated fraction in the form of a liquid+vapour mixture, (vi) separators (6A, 6B) connected to the said withdrawal lines (5A, 5B) to collect the solvent in a line (7A, 7B), in which the line (7A) is connected to the line (3B) as heat-exchange fluid line, and which additionally comprises a heat exchanger (10) positioned on the line (1A) and furthermore connected to the line (7B) as heat-exchange fluid.

A further subject-matter of the invention is still a chromatography device comprising:

(i) a central unit for separation on a chromatographic bed, (ii) at least two lines of fractions (1A, 1B) deriving therefrom, the lines (1A) and (1B) corresponding to extract and raffinate fractions, respectively, (iii) at least two evaporators (2A, 2B) connected to the said fraction lines, (iv) heat-exchange fluid lines (3A, 3B) being connected to at least two evaporators (2A, 2B) respectively, (v) withdrawal lines (5A, 5B) collecting, downstream of the said evaporators (2A, 2B), the at least partially evaporated fraction in the form of a liquid+vapour mixture, (vi) separators (6A, 6B) connected to the said withdrawal lines (5A, 5B) to collect the solvent in a line (7A, 7B), in which the line (7A) is connected to the line (3B) as heat-exchange fluid line, and which additionally comprises a solvent and heat-exchange fluid line (4B) leaving the evaporator (2B) and a line (1BA) connecting the said line (4B) to the line (1A) feeding the evaporator (2A), for partial recycling.

Other characteristics and advantages of the invention will now be described in detail in the account which follows, which is given with reference to the appended figures, in which:

BRIEF DESCRIPTION OF THE DRAWINGS

FIG. 1 diagrammatically represents a conventional device.

FIG. 2 diagrammatically represents a device according to a first embodiment of the invention.

FIG. 3 diagrammatically represents a device according to a second embodiment of the invention.

FIG. 4 diagrammatically represents a device according to a third embodiment of the invention.

DESCRIPTION OF PREFERRED EMBODIMENTS

With reference to FIG. 1, and by way of example, it is assumed that the desired product is found in fraction A. It is normally essential for fraction A to have to be concentrated as the purified product is generally used in a dry form and thus in a form freed from the solvent. The product or products which are found in fraction B are either destroyed or recycled (for example, after an isomerization). It is desirable to concentrate fraction B to minimize the volume of the discharges and to be able to recycle the solvent. The method according to the prior art, in which fraction A is concentrated to recover product A and solvent and in which fraction B is separated to recover the solvent (and optionally product B), comprises the following essential components. The lines, for example of extract and of raffinate, are lines 1A and 1B, for fractions A and B, respectively. These lines feed evaporators 2A and 2B, respectively, which are heated by heat-exchange fluids in pipes 3A and 3B, respectively; the heat-exchange fluids leave the evaporators 2A and 2B via pipes 4A and 4B, respectively. The fractions, in the form of a liquid+vapour mixture, leave the evaporators 2A and 2B via pipes 5A and 5B, respectively. These pipes feed separators 6A and 6B, in which the products A and B are recovered at the bottom (identified in the figure by the circled letters A and B), whereas the solvent vapours are collected at the top in the pipes 7A and 7B, respectively. These pipes 7a and 7B are connected to heat exchangers 8A and 8B, respectively. These exchangers 8A and 8B are cooled conventionally by a liquid coolant in order to condense the solvents. The solvents resulting from fractions A and B are then recovered via the pipes 9A and 9B, respectively, and are optionally subsequently combined to be recycled. With reference to FIG. 2, and by way of example, it is again assumed that the desired product is found in fraction A. The method according to a first embodiment comprises the following components. The identical components with respect to FIG. 1 have the same references and are not described again. The pipe 7A, unlike the prior art represented in FIG. 1, is not connected to a heat exchanger but to the pipe 3B of the evaporator 2B; the solvent (vapors) of the line 7A is used as heat-exchange fluid in the evaporator 2B. The pipe 4B which leaves the evaporator 2B is connected to the heat exchanger 8A. The line 7B is connected conventionally to the heat exchanger 8B. The solvents resulting from fractions A and B via the pipes 9A and 9B, respectively, are then recovered as in the prior art and are optionally subsequently combined to be recycled.

With reference to FIG. 3, a similar device to that of FIG. 2 is used. The identical components have the same references and are not described again. According to the embodiment of FIG. 3, the solvent line 7B is used to preheat the line 1A of fraction A in an exchanger 10. The line 7B' of solvent resulting from fraction B leaves this exchanger to be optionally combined with the solvent from the line 9A or to be conveyed to the exchanger 8B in a conventional fashion (second alternative form represented in FIG. 3).

With reference to FIG. 4, a similar device to that of FIG. 2 is used. The identical components have the same references and are not described again. According to the embodiment of FIG. 4, the solvent line 4B is partially recycled (via the dotted line 1BA) and mixed with the line 1A feeding the evaporator 2A. The degree of recycling is a function of the amounts of heat of each line (for example, from 10 to 50% and in particular approximately 30%). This implementation is suitable when it is desired to evaporate fraction B using the vapours from fraction A and when the throughput of vapour originating from fraction A is not sufficient to make possible complete evaporation of fraction B. This embodiment would substitute for the simpler one which consists in reversing the lines A and B (that is to say, according to a scheme which is reversed with respect to the embodiments of FIGS. 2 and 3). According to the embodiment of FIG. 4, it is possible to use the evaporator 2A alone, which can be useful in a period of startup (in particular if the valuable fraction is present in fraction B and if it is desired to use fraction B only once the system is correctly adjusted to avoid risks of contamination).

It is also advantageous to apply the principle of the preheating of FIG. 3 to the device of FIG. 4 (third embodiment). In this case, the solvent line 7B is used to preheat the line 1A of fraction A in an exchanger 10 (positioned between the point of connection of the lines 1BA/1A and the evaporator 2A or before the said point of connection).

The evaporators used in the invention are conventional evaporators which can be thin-film or falling-film evaporators. The evaporators can be single-effect or multiple-effect evaporators, certain effects being fed by a heat-exchange fluid while others are fed by the vapours from the other line. This type of exchanger is useful when the amount of heat contributed by the solvent vapours is not sufficient to completely evaporate the solvent from the other fraction.

The exchangers (condensers) can be combined into a single unit, if appropriate. Forced recirculation of the fluids to be treated can be carried out in order to further increase the heat transfer coefficients in the evaporator.

It is clear that the respective sizes of the two lines can vary according to the throughputs to be treated, the desired concentration factors or thermal constraints on the desired product from the fraction.

The invention can be applied to countercurrent chromatographic separation methods and devices in the broad sense and in particular of the abovementioned SMB type or of the Varicol type. For the record, it should be pointed out that this latter device (and associated method) is disclosed in particular in the document WO-A-0025885, corresponding to U.S. Pat. No. 6,136,198, U.S. Pat. No. 6,375,839, and U.S. Pat. No. 6,413,419, all being herein incorporated by reference. Is disclosed therein a method for the separation of at least one component from a mixture comprising it in a device exhibiting a combination of chromatographic columns or sections of chromatographic columns comprising an adsorbent, which columns are arranged in series or in a loop, the loop comprising at least one point for an injection of charge, one point for a withdrawal of raffinate, one point for an injection of an eluent and one point for a withdrawal of extract, in which a chromatographic region is established between an injection point and a withdrawal point or vice versa, the method being characterized in that, after a given period of time, all the injection and withdrawal points are shifted by the same number of columns or column sections, advantageously by one column or column section, in a given direction defined with respect to that of the flow of a main fluid circulating through the loop and in that, during the said period, the various injection and withdrawal points are shifted at different times so that the lengths of the regions defined by the said different points are variable.

The following examples illustrate the present invention without, however, limiting the scope thereof.

EXAMPLE 1

A chromatographic system of Simulated Moving Bed (SMB) type is used to carry out the separation of two isomers. The two outlet lines are available at 25° C. and have the following characteristics:

line A (extract line): 3 200 l/h of a 60/40 heptane/ethanol mixture comprising a product at 4 g/l.

line B (raffinate line): 2 200 l/h of a 60/40 heptane/ethanol mixture comprising a product at 6 g/l.

Three devices, namely the conventional device represented by FIG. 1, a device according to the invention No. 1 and a device according to the invention No. 2, corresponding to the devices of FIGS. 2 and 3, respectively, were used for the purpose of concentrating these solutions so that the products are found at a concentration of 150 g/l.

The energy consumptions necessary for these operations are shown in the following table.

| Results obtained according to the device used in terms of energy consumption (kW) | | | |
|---|---|---|---|
| | Energy to evaporate the line B | Energy to evaporate the line A | Total |
| Conventional device | 335 | 515 | 850 |
| Device according to the invention No. 1 | 0 | 515 | 515 |
| Device according to the invention No. 2 | 0 | 440 | 440 |

It is thus found that, the amount of energy available in the vapours from the line A being greater than the amount necessary for the evaporation of line B, the device according to the invention No. 1 makes it possible to dispense with the need for heat-exchange fluid for the evaporation of the line B.

It is also found that the preheating of the fluid from the line A using the condensates from the line B, which preheating is used in the device according to the invention No. 2, makes it possible to further improve the results by reducing the amount of energy necessary for the evaporation of the line A.

EXAMPLE 2

The conditions described in Example 1 are repeated but the two outlet lines now have the following characteristics:

line A (extract line): 2 200 l/h of a 60/40 heptane/ethanol mixture comprising a product at 4 g/l.

line B (raffinate line): 3 200 l/h of a 60/40 heptane/ethanol mixture comprising a product at 6 g/l.

This time the device according to the invention No. 3, corresponding to the device of FIG. 4, was used. The degree of recycling is 30%. Use was also made of the same device incorporating the preheating (application to the device No. 3 of the preheating according to the device No. 2).

The energy consumptions necessary for this operation are shown in the following table.

| Results obtained according to the device used in terms of energy consumption (kW) | | | |
|---|---|---|---|
| | Energy to evaporate the line B | Energy to evaporate the line A | Total |
| Conventional device | 515 | 335 | 850 |
| Device according to the invention No. 3 | 0 | 515 | 515 |
| Device according to the invention No. 3 with preheating | 0 | 440 | 440 |

It is therefore found that the partial recycling of the fluid from the line 4B into the line 1A makes it possible to dispense with the need for heat-exchange fluid for the evaporation of the line B.

What is claimed is:

1. A method for chromatographic separation producing at least two fractions, in which method:
   (i) the solvent is at least partially evaporated from the said fractions produced,
   (ii) the solvent vapours thus produced are separated,
   in which stage (i) of the method is carried out, for at least one of the said fractions, at least partially with the separated solvent vapours originating from one of the other evaporated fractions.

2. The method according to claim 1, in which two extract and raffinate fractions are evaporated.

3. The method according to claim 1, in which stage (i) is carried out, for a fraction under consideration, entirely with the separated solvent vapours originating from one of the other evaporated fractions.

4. The method according to claim 1, in which a portion of the separated solvent vapours originating from the other evaporated fraction is partially recycled, after evaporation of the fraction under consideration, to the upstream side of stage (i) for evaporation of the said other fraction.

5. The method according to claim 1, in which at least one of the fractions is preheated before evaporation with the separated solvent vapours originating from one of the other evaporated fractions.

6. The method according to claim 1, in which the solvent is recycled.

7. The method according to claim 1, in which the chromatographic separation is of the SMB type.

8. The method according to claim 1, in which the chromatographic separation is of the Varicol type.

9. A method for chromatographic separation producing at least two extract and raffinate fractions, in which method:

(i) the solvent is at least partially evaporated from the said fractions produced, (ii) the solvent vapours thus produced are separated, in which stage (i) of the method is carried out, for at least one of the said fractions, at least partially with the separated solvent vapours originating from one of the other evaporated fractions, in which stage (i) is carried out, for a fraction under consideration, entirely with the separated solvent vapours originating from one of the other evaporated fractions.

10. The method according to claim 9, in which a portion of the separated solvent vapours originating from the other evaporated fraction is partially recycled, after evaporation of the fraction under consideration, to the upstream side of stage (i) for evaporation of the said other fraction.

11. A method for chromatographic separation producing at least two extract and raffinate fractions, in which method:

(i) the solvent is at least partially evaporated from the said fractions produced, (ii) the solvent vapours thus produced are separated, in which stage (i) of the method is carried out, for at least one of the said fractions, at least partially with the separated solvent vapours originating from one of the other evaporated fractions, in which stage (i) is carried out, for a fraction under consideration, entirely with the separated solvent vapours originating from one of the other evaporated fractions, in which at least one of the fractions is preheated before evaporation with the separated solvent vapours originating from one of the other evaporated fractions.

* * * * *